United States Patent
Gromala et al.

Patent Number: 5,524,444
Date of Patent: Jun. 11, 1996

[54] TEMPERATURE CONTROL OF AN APPLIANCE USING AMBIENT AIR TEMPERATURE DETERMINATION

[75] Inventors: Joseph R. Gromala, Roselle; Vu T. Nguyen, Glendale Heights, both of Ill.

[73] Assignee: Robertshaw Controls Company, Richmond, Va.

[21] Appl. No.: 357,930

[22] Filed: Dec. 16, 1994

[51] Int. Cl.$^6$ .................................... F25B 19/00
[52] U.S. Cl. ................. 62/115; 62/231; 236/78 D
[58] Field of Search ............... 62/231, 229, 115; 236/91 R, 78 D

[56] References Cited

U.S. PATENT DOCUMENTS

| | | | |
|---|---|---|---|
| 4,417,450 | 11/1983 | Morgan, Jr. et al. | 62/231 |
| 4,495,780 | 1/1985 | Kaneko et al. | 62/229 |
| 5,187,941 | 2/1993 | Tershak et al. | 62/229 X |
| 5,224,557 | 7/1993 | So et al. | 62/231 X |

*Primary Examiner*—William E. Wayner
*Attorney, Agent, or Firm*—Robert J. Black

[57] ABSTRACT

A method of controlling the temperature of air inside two compartments of a refrigerator or similar appliance utilizing a single temperature sensor and the known air temperature external of the appliance. Based on knowledge of the temperature relationship between both compartments, the appliance performance is optimized based on outside temperatures. As a result of this process, the compartment without a sensor functions with increased temperature control accuracy.

10 Claims, 3 Drawing Sheets

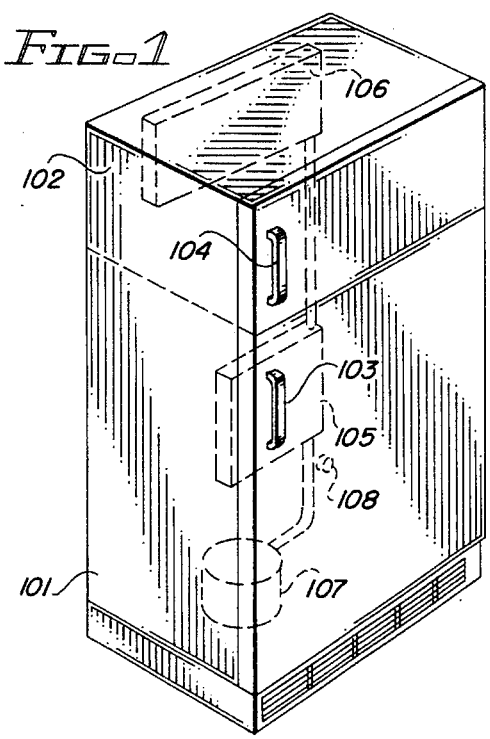

FIG. 1

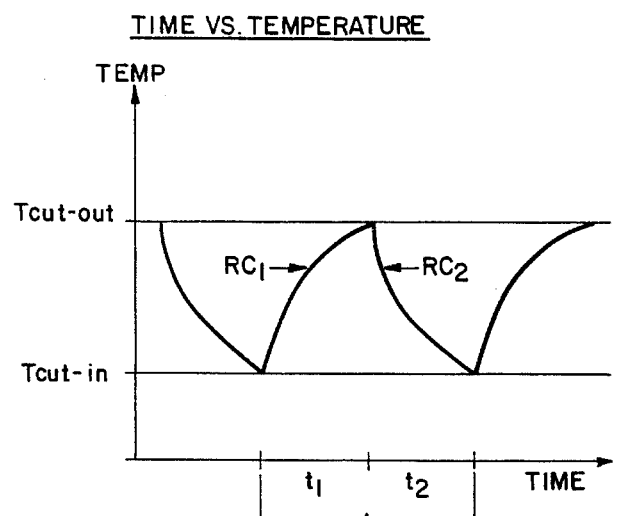

TIME VS. TEMPERATURE

FIG. 2

| TABLE 1 ON OR OFF TIMES IN MINUTES OR % OPERATION | | | | | |
|---|---|---|---|---|---|
| OUTSIDE TEMP (°C) | DESIRED TEMPS OF FRIDGE = 6°C / FREEZER = -10°C | | | | |
| | FRIDGE | FREEZER | | | |
| 11 | 8 | 17 | | | |
| 13 | 14 | 23 | | | |
| 15 | 20 | 29 | | | |
| 17 | 26 | 35 | | | |
| 19 | 32 | 41 | | | |
| 21 | 38 | 47 | | | |
| 23 | 44 | 53 | | | |
| 25 | 50 | 59 | | | |
| 27 | 56 | 65 | | | |
| 29 | 62 | 71 | | | |
| 31 | 68 | 77 | | | |
| 33 | 74 | 83 | | | |
| 35 | 80 | 89 | | | |
| SETTING = | | | | | |
| NORMAL | | | | | |
| EX. | | ADJUST | | | |
| MEASUREMENT | | PERIOD | MEASUREMENT | | ADJUST PERIOD |
| 20,20,20 | | | 21,19,20 | | |
| 1 AVERAGE = 20 | >TEMP=15 | 29,29 | AVERAGE = 20 | >TEMP=15 | 29,29 |
| | | | | | ETC. |
| 66,69,69 | | | 68,68,68 | | |
| 2 AVERAGE = 68 | >TEMP=31 | 77,77 | AVERAGE = 68 | >TEMP=31 | 77,77 |
| Tm 1 | | Tadjust 1 | Tm 2 | | Tadjust 2 |

PATENT 24A, INSIDE TIMES OF FRIDGE AND FREEZER VERSUS EXTERNAL TEMPERATURES

LEGEND: ▨ FRIDGE ☐ FREEZER (bar chart of ON or OFF or % time (MIN.) vs OUTSIDE TEMPERATURE (°C) from 11 to 35)

FIG. 3

TEMPERATURE CONTROL OF AN APPLIANCE USING AMBIENT AIR TEMPERATURE DETERMINATION

BACKGROUND OF THE INVENTION

1. Field of the Invention

The present invention relates to household appliances, and more particularly to cooling systems such as those utilized in refrigerators, freezers and air conditioners.

2. Background Art

In the usual operation of appliances, such as refrigerators, freezers and air conditioners, the appliance includes a sensor inside each compartment and if it is a multi-compartment unit, such as a refrigerator with a freezer, a sensor in each compartment to cause the initiation of the operation of a compressor based on preestablished consumer user settings (cooler or warmer) establishing preset temperatures associated with the setting established by the user.

Normally, such preset temperatures are the same for each user setting, independent of ambient temperatures n which the appliances operated. As in the case of many refrigerators, some may include a single evaporator with different ways of transferring cold air to each compartment. Usually this involves some mechanical means, such as a sliding door or fan to let cold air move from one compartment to another compartment. Still other types may include a single evaporator with sections balanced between the two compartments. Frequently this balanced type utilizes a single sensor tot establishing the temperature regulation being satisfactory for both compartments only for a small range of external temperatures. Such single sensor units result in only one compartment with very good regulation for all external temperatures, while the temperature in the other has poor regulation with variance in external temperatures outside a very narrow range.

A search of the background art directed to the subject matter of the present invention and conducted in the U.S. Patent and Trademark Office disclosed the following U.S. Letters Patent:

- U.S. Pat. No. 5,255,530 is drawn to a two-zone refrigerator temperature control, including an evaporator fan control led by the temperature within a fresh food compartment while the speed of the compressor motor and condenser fan are control led by a temperature sensor within the freezing compartment.

- U.S. Pat. No. 4,495,780 teaches a hermetically closed control box, or cabinet, with a plurality of calling devices included therein. One temperature sensor is included within the cabinet while another for detecting ambient temperatures is placed outside the control box. Comparator circuitry receives signals from the two sensors submitting them to logic control circuits to control cooling equipment.

- U.S. Pat. No. 5,187,941 is drawn to a refrigerator system that detects abnormally low temperature conditions in a particular portion of the fresh food compartment. If the sensed temperature fails to rise to a predetermined temperature within a particular range of time, an abnormal temperature condition is considered to exist requiring corrective action.
  The two sensors included deal with temperature interaction between the two compartments of the refrigerator.

- U.S. Pat. No. 5,224,355 pertains to a plural temperature adjustment apparatus for a refrigerator whereby cooling is automatically changed based on temperature changes within the refrigerator itself. The system utilizes the input of data to a computer for refrigerator control.

- U.S. Pat. No. 4,718,247 is drawn to a system that teaches the driving of a refrigerator at a higher speed when the internal temperature of the freezer compartment or fresh food compartment rise temporarily.

- U.S. Pat. No. 4,916,912 pertains to defrosting of a heat pump wherein differences between exterior ambient temperatures and exterior heat exchanger temperatures are compared for determination of a difference function. Two sensors are utilized to determine operation of the system microprocessor.

Based on a thorough review of the above identified patents, we believe that none of the above teach, disclose or claim the novel combination of elements and functions found in the improved temperature control system taught by the present invention.

Accordingly, it is the object of the present invention to provide a temperature control system for a two compartment appliance utilizing a single sensor. A particular feature of the present invention is the utilization of information on the external ambient temperature to allow normal control of one compartment and indirect control of the second. The cooling system is arranged to operate differently for each user setting based on varying outside ambient temperatures. This method allows for a substantial improvement in temperature control accuracy for the compartment which does not contain a sensor.

SUMMARY OF THE INVENTION

In the present invention, the solution is drawn to a refrigerator having two compartments requiring that the temperatures be controlled at two different temperatures. In the usual arrangement, one of the sections is for food stored above 0° C. (a typical refrigerator section) and a second section for food stored below 0° C. (the freezer section). Assuming for the purpose of the present invention, the doors to both sections are closed. In the arrangement shown, the refrigerator has a single evaporator with one portion in the refrigerator section and another portion in the freezer. The shape and volume of the evaporator is so designed that the temperature is balanced in both parts when it is properly cooling.

In the present invention, the single temperature sensor is utilized within the refrigerator section, to cause the associated compressor to turn on and off so that the desired temperature is achieved. Thus, the arrangement is quite accurate in its control of the refrigerator section. While placed in an environment of normal external temperatures, the freezer operates near its correct temperature due to the balanced size of the evaporator. When the external temperature varies widely, however, the freezer regulation becomes increasingly poorer. For example, the compressor only on long enough in a cold external temperature, e.g. 2° C., to allow the refrigerator section to go to the correct temperature. This prevents the freezer from getting cold enough to provide optimal freezing temperatures. This condition results from the greater temperature difference between the freezer and the external temperature than the difference between the refrigerator section and the external temperature.

Thus, the present invention utilizes external temperature information to compensate for inaccurate freezer temperatures. Initially, testing is performed and data collected on both compartments of the refrigerator in varying external temperature conditions. In this arrangement, the time takes for the compressor to turn on or turn off will vary and correlate to the outside temperature. In this arrangement, both the refrigerator and freezer will have rise and fall times which correlate to the external temperature. Optimum times for each compartment are not the same, which of course is the problem, Should the outside temperature be warmer than normal, the time for the inside temperature to fall will increase and the time for it to rise in temperature will decrease. On the other hand, if the outside temperature is colder, than the opposite results occur.

A minimum of two outside temperatures are utilized to obtain the initial reference times for both the refrigerator and the freezer sections. Initial conditions only help to get more accurate outside temperatures.

A device such as a microcontroller is added to the refrigerator to monitor the operation of the compressor based on readings of the sensor placed inside the refrigerator compartment. The turn on and turn off times for the compressor, as referenced, are stored in the microcontroller The microcontroller then keeps track of the time it takes for he temperatures to change between the turn on and turn off temperatures. In this instance, reference times for the refrigerator turn on and turn off times are compared to the present time conditions in the refrigerator to calculate temperature outside the refrigerator. With this information on hand, the microcontroller is able to operate the compressor in an adjusted way to make sure the freezer temperature closer to its optimal temperature.

While it would be possible for the consumer to change the desired temperature in the refrigerator or the freezer, the microcontroller would still be able to adjust the reference times based on the initial data or is able to make small shifts in reference values so that outside temperatures may still be detected. In other words, if there are two desired temperatures, the microcontroller can recognize these settings and have two different groups of reference times. Since the external temperature effects the inside temperature differently based on the differential between the two set temperatures, reference times can be different for each setting.

BRIEF DESCRIPTION OF THE DRAWINGS

A better understanding of the present invention may be had from consideration of the following detailed description taken in conjunction with the following drawings:

FIG. 1 is an isometric sketch of a refrigerator or similar device including both refrigerator and freezer sections, and employing the teachings of the present invention.

FIG. 2 is a drawing showing the effect of time versus temperature.

FIG. 3 is a graph indicating the inside times of the refrigerator and freezer versus external temperatures, as well as a table showing the on and off time in minutes or percentage of operation.

DETAILED DESCRIPTION OF THE PREFERRED EMBODIMENTS

For a better and more thorough understanding of the present invention, it will be shown embodied in a refrigerator having both refrigerator and freezer sections for purposes of illustration. It should be understood, however, that the invention is not limited to use solely in refrigerators but other appliances, particularly those that include X compartments and X-1 sensors. That is to say, if the unit has two compartments, there will only be one sensor, etc. The present invention is primarily based on the utilization of software algorithms for use in the described system.

Figure 5:
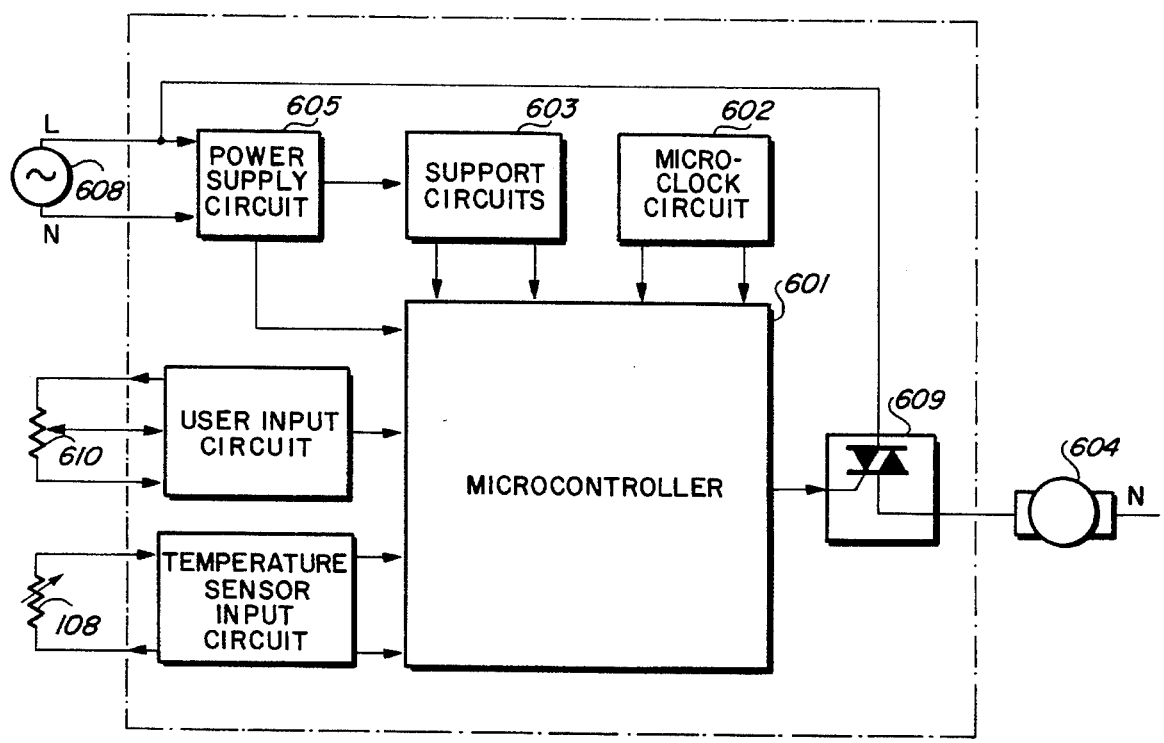
FIG. 5 is a block diagram of a refrigerator equipped with temperature control system that utilizes the ambient air for temperature determination.

Referring initially to FIGS. 1 and 5, compensation for proper freezer temperature is handled in the following way. A single sensor 108 utilized within the refrigerator section 101, while none are included in the freezer 102.

For three on-off cycles, the measurement period (of the compressor) times of each refrigerator cycle are measured. External temperature is known from the comparison to reference times which were recorded previously. For the next two cycles of operation known as the adjust period, the microcontroller will force the compressor on and off according to the reference times in that external temperature of the freezer unit. Microcontroller 601 will then repeat these periods. The microcontroller 601 as shown in FIG. 5 will force the compressor on and off according to reference times and the external temperature of the freezer. The microcontroller 601 then repeats these periods. The forced adjust period based on freezer times is alternated with the measurement period which is based on refrigerator temperature.

Referring now to FIG. 5, temperature sensor 108 placed inside the refrigerator section, in section 101 and seen in FIG. 1, operates the refrigerator internal cold producing device, such as compressor 107 as seen in FIG. 1, which turns on and off so the inside of the refrigerator is regulated at an average established temperature. A microcontroller 601, or some similar measuring device, measures the time it takes for the sensor temperature of sensor 108 to rise and fall. Since the information stored in the microcontroller consists of times of internal operation which correlate to various external temperatures of the refrigerator, the evaporator section, as may be seen in FIG. 1, is balanced between section 105 and refrigerator section 101 and evaporator section 106 and freezer compartment 102. This arrangement insures that the refrigerator normally will be operated at 6° C. with the freezer being operated at −10° C. in a room temperature of 25° C.

As may be seen by referring to FIG. 3, the refrigerator is initially place in a room having a temperature of 15° C. At this time, the inside of the refrigerator is set to operate at the 6° C. temperature and the desired freezer temperature at −10° C. The microcontroller 601 will measure on (t2) three times as shown in FIG. 2 averaging them to twenty minutes as shown in the table portion of FIG. 3. From the stored reference times, the outside temperature is 15°C. Because the evaporator is balanced for 25° C. external temperatures, the freezer will be warmer than −10° C. so the microcontroller will start an adjust period (Tadjust 1, as shown in FIG. 3) for two cycles when it forces the compressor on for a period of 29 minutes. This will then make the freezer section −10° C. in a 15° C. room and the refrigerator portion will be a little colder than needed. The microcontroller 601 will then start another adjustment period (TM 2) and adjust accordingly (Tadjust 2) as shown in FIG. 3. Accordingly, the performance of the freezer is substantially improved due to the adjust period and known edge of the external temperature.

When the room temperature with the same refrigerator is changed to 31° C., as shown in the table portion of FIG. 3, the microcontroller will measure 3 on times with an average time being 68 minutes (shown as Tm 1 in FIG. 3). From the stored reference times, the outside temperature is determined to be 31°C. Thus, the microcontroller will start an adjust period (again see Tadjust 1 column. FIG. 3) for two cycles when it will force the compressor on for a total of 77 minutes. This will make the freezer portion −10° C. in the 31° C. room. This time the microcontroller will start another measurement period (Tm 2) and adjust accordingly (Tadjust 2) as shown in FIG. 3. As noted above, during the adjust period the microcontroller could also make the temperature compensation in the refrigerator compartment, energy efficiency improvements as well as temperature changes to other compartments which are also in the same room as the refrigerator. It is also possible in the alternative for the microcontroller to utilize the adjust period as the next measurement period.

Figure 4:
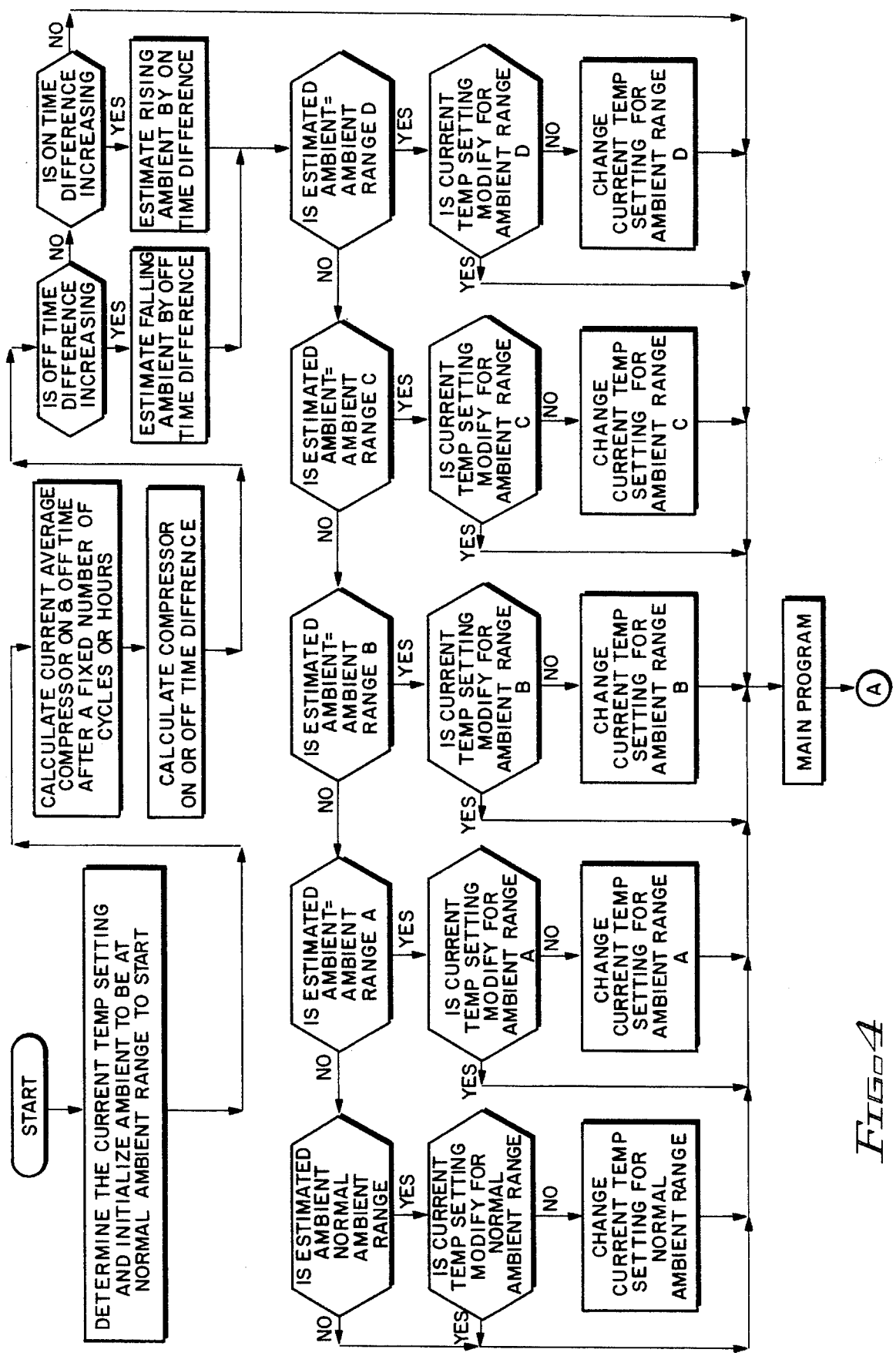
FIG. 4 is a flow chart illustrating software as utilized in the present invention for calculating the compressor on and off time differences.

Referring now to the software flow chart of FIG. 4, it will be seen that at the start of the system operation, or in response to external interference, such as a door opening or power interruption, it is very important to allow the system to operate until the compartment is stabilized. The system is considered stabilized when the compartment temperature has reached its cut-out temperature at the current setting. The cut-out temperature normally is the low temperature of a setting at which the compressor will turn off. Stability of the compartment temperature is necessary to insure accuracy of ambient temperature detection.

Once the compartment temperature is stabilized, compressor on and off times are measured during each compressor cycle. Compressor on and off times will be calculated for a fixed length of time or a fixed number of compressor cycles to determine average time. Average compressor on and off time is then compared to a known average on and off time of a setting to decide if there is a change in the ambient temperature. If the average compressor off time is increasing, then the ambient is regarded as falling, while the average compressor on time is increasing it is then determined that the ambient temperature is regarded as rising. These known average on and off times of the settings are values based on experimentation and testing. Each ambient range will have a distinct average on and off time for every setting to compare. Change in the compressor on time will be more noticeable at higher ambient temperatures and change in compressor off times will be more noticeable at lower ambient temperatures. Utilizing compressor on and off times when making the comparison will maximize accuracy of the ambient detection.

When the program detects a change within a certain ambient range, the setting will be modified to the adaptive settings. The adaptive settings will have a different cut-in and cut-out temperature which will optimize the system performance for that ambient range. The cut-in temperature is the high temperature setpoint of a setting at which the compressor will turn on.

Referring now to FIG. 4, it may be seen that after the temperature is stabilized, the average compressor on and off times after a fixed number of cycles or hours are calculated, and after which calculation of the compressor on and off times difference takes place, decisions are made as to whether the off time is increasing or decreasing, should it not be increasing, another decision is made as to whether the on time difference is increasing. In the first case, if the ambient temperature is failing by virtue of the calculation of the off and on time difference, it is referred to number of decisions within selected ambient ranges, known as ranges A, B, C and D, as well as no change, decisions are made, and then if the decision is made that it is within a particular range, or that it is not within the normal ambient temperature range, another decision is made as to whether the current temperature setting is within the modified ambient range as to one of A, B, C, D or normal ambient range. If the answer is "no", appropriate changes are made to bring the current temperature setting within the selected ambient range, or should it be "yes", the main program would be returned and repeated from point A as shown on the software flow chart.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A method of controlling the temperature of an appliance using determination of ambient air temperature in an area surrounding an appliance including a cold producing element and means for setting the temperature of said appliance, said method comprising the steps of:

first calculating the current average cold producing element on and off time after a fixed number of cycles;

second calculating the cold producing element on or off time difference;

determining whether the average on and off times are increasing;

determining an indication of a falling, or in the alternative a rising ambient temperature based on the presence of an increase in the off times of said cold producing element, or in the alternative an indication of an increase in the on time of said cold producing element;

estimating the falling ambient temperature based on said off time difference, or in the alternative estimating the rising ambient temperature by the on time difference;

comparing said estimated ambient temperatures with a plurality of estimated ambient temperature ranges;

determining whether current temperature settings are appropriate for the determined ambient temperature range;

changing the current temperature setting for the determined ambient temperature range if the comparison current temperature setting is not the same;

or in the alternative if the current temperature setting is appropriate for the ambient temperature range determined, returning to said first calculating step for calculating the current average compressor on and off times.

2. A method of controlling the temperature of an appliance using determination of ambient air temperature as claimed in claim 1 wherein:

first calculating step calculates said current average compressor on and off time after a fixed number of hours.

3. A method of controlling the temperature of an appliance using determination of ambient air temperature as claimed in claim 1 wherein:

the step of determining that the average off time of said cold producing element is increasing provides an estimate that said ambient temperature is falling.

4. A method of controlling the temperature of an appliance using determination of ambient air temperature as claimed in claim 1 wherein:

the step of determining that the average on time of said cold producing element is increasing provides an estimate that said ambient temperature is rising.

5. A method of controlling the temperature of an appliance using determination of ambient air temperature as claimed in claim 1 wherein:

the step of determining that the average on and off times of said cold producing element are not increasing is followed by the step of returning to said first calculating step for calculating said current average cold producing element on and off time.

6. A method of controlling the temperature of an appliance using determination of ambient air temperature as claimed in claim 1 wherein:

said cold producing element is a compressor.

7. A method of controlling the temperature of an appliance using determination of ambient air temperature as claimed in claim 1 wherein:

said first calculating step is performed by a microcontroller.

8. A method of controlling the temperature of an appliance using determination of ambient air temperature as claimed in claim 1 wherein:

said second calculating step is performed by a microcontroller.

9. A method of controlling the temperature of an appliance using determination of ambient air temperature as claimed in claim 1 wherein:

said determination of on and off time differences increasing are determined by said microcontroller.

10. A method of controlling the temperature of an appliance using determination of ambient air temperature as claimed in claim 1 wherein:

said current temperature setting is modified to agree with the ambient temperature range determined by said estimating step.

* * * * *